US008050650B2

(12) United States Patent
Tsai et al.

(10) Patent No.: US 8,050,650 B2
(45) Date of Patent: Nov. 1, 2011

(54) HAIRPIN BAND PASS FILTER AND RELATED FREQUENCY DOWN CONVERTER

(75) Inventors: Cho-Jui Tsai, Taipei Hsien (TW); Tzong-Jyh Chen, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 397 days.

(21) Appl. No.: 12/391,239

(22) Filed: Feb. 23, 2009

(65) Prior Publication Data

US 2010/0041362 A1 Feb. 18, 2010

(30) Foreign Application Priority Data

Aug. 12, 2008 (TW) ............................... 97130683 A

(51) Int. Cl.
*H04B 1/16* (2006.01)

(52) U.S. Cl. ....................................... 455/339; 455/285

(58) Field of Classification Search .................. 455/302, 455/306, 307, 339, 285
See application file for complete search history.

(56) References Cited

U.S. PATENT DOCUMENTS

| | | | | |
|---|---|---|---|---|
| 5,995,818 | A * | 11/1999 | Smith | 455/307 |
| 7,142,836 | B2 * | 11/2006 | Yang | 455/307 |
| 7,174,147 | B2 * | 2/2007 | Toncich et al. | 455/339 |
| 7,289,784 | B2 * | 10/2007 | Nam | 455/339 |

* cited by examiner

*Primary Examiner* — Hai L Nguyen
(74) *Attorney, Agent, or Firm* — Winston Hsu; Scott Margo

(57) ABSTRACT

A band pass filter includes a first micro-strip port for receiving a radio-frequency signal, a second micro-strip port for outputting a filtered radio-frequency signal and comprising at least one resonating cavity formed for enhancing rejecting effect of image frequency corresponding to the filtered radio-frequency signal, and a plurality of resonators arranged between the first micro-strip port and the second micro-strip port for performing band pass filtering on the radio-frequency signal to generate the filtered radio-frequency signal.

17 Claims, 5 Drawing Sheets

HAIRPIN BAND PASS FILTER AND RELATED FREQUENCY DOWN CONVERTER

BACKGROUND OF THE INVENTION

1. Field of the Invention

The present invention relates to a band pass filter and related frequency down converter, and more particularly, to a band pass filter and related frequency down converter for enhancing rejecting effect of image frequency.

2. Description of the Prior Art

In a broadcast system, a superheterodyne receiver is the most widespread use receiver, which can execute carrier frequency adjustment (namely select a channel), filtering, and amplifying. In the superheterodyne receiver, signal is received by an antenna, and performed amplifying, RF (radio-frequency) filtering, IF (intermediate frequency) transformation, and finally, via one or more IF amplifying and filtering processes, transformed to a base frequency band for succeeding demodulation. Transforming RF to IF is always influenced by image frequency interference, and may cause some problems.

Please refer to FIG. 1, which is a schematic diagram of a frequency down converter 10 for a superheterodyne receiver according to the prior art. The frequency down converter 10 includes low noise amplifiers 100 and 102, a receiver end 103, an image reject filter 104, a mixer 106, a local oscillator 108, an IF low pass filter 110, and an intermediate frequency amplifier 112. Below is a summary of an operation method of the frequency down converter 10. An RF signal $V_{RF1}$ is received by an antenna, and enters the frequency down converter 10. The RF signal $V_{RF1}$ is amplified to an RF signal $V_{RF2}$ via the low noise amplifiers 100 and 102. Then, the image reject filter 104 receives the RF signal $V_{RF2}$ via the receiver end 103, and filters out image frequency signals to generate a filtered RF signal $VF_{RF}$. Finally, the filtered RF signal $VF_{RF}$ transforms to an IF section through the mixer 106, and outputs IF signal $V_{IF}$ via filtering of the IF low pass filter 110 and amplifying of the IF amplifier 112. The image reject filter 104 is used for removing interference of the image frequency. A cause of the image frequency is two input frequencies $|f_{LO}\pm f_{IF}|$ are both outputted to a frequency $f_{IF}$ through the mixer 106. The frequency $f_{LO}$ is an oscillatory signal frequency of the local oscillator 108, and the frequency $f_{IF}$ is a frequency of the IF signal $V_{IF}$. Therefore, in the superheterodyne receiver, when a signal of spectrum corresponding to sides of a local oscillating signal goes through the mixer 106, the signals enter the same spectrum, and form an interference signal which lowers a signal to interference ratio, influences a desired received signal, and affects a receiving efficiency of the superheterodyne receiver. For solving a problem of image frequency interference, the most common method is to add a band pass filter in front of the mixer 106, i.e., the image reject filter 104, for filtering out the interference signal before entering the mixer 106, so as to lower the interference.

In order to examine an effect of the frequency down converter 10, there is an important standard which is image frequency rejection ratio defined as a gain between a received frequency and an image frequency. For example, in a satellite frequency down converter, the general standard is 40 db. Besides, a difference of an insertion loss between the received frequency and the image frequency of the image reject filter 104 is the most important parameter for deciding the image frequency rejection ratio of the frequency down converter 10.

There are many methods for realizing the image reject filter 104 according to the prior art, for example, hairpin band pass filter, parallel-coupled line filter, etc. Please refer to FIG. 2, which is a schematic diagram of a hairpin band pass filter 20 according to the prior art. The hairpin band pass filter 20 is a transverse symmetry structure, which includes micro-strip ports IO_a and IO_b, and resonators RSN_1~RSN_n. The micro-strip ports IO_a and IO_b connect to a front-stage and a rear-stage circuit for receiving and outputting signals. A length of each of the resonators RSN_1~RSN_n is half of a wavelength corresponding to a desired received signal, and the number “n” of the resonators RSN_1~RSN_n represents an order of the hairpin band pass filter 20. Therefore, a designer can vary the number “n” according to different demands. For example, FIG. 3 is a frequency response diagram of the hairpin band pass filter 20 when n=5. In FIG. 3, curves a1, b1 and c1 are respectively corresponding to scattering parameters S11, S21 and S22. Since a related definition is fairly known for people in the art, a detail description is omitted herein, and can be found in books listed below, for example, *Microelectronic Circuits,* 2004, 5$^{th}$ edition, written by Adel S Sedra. and Kenneth C. Smith, *Feedback Control of Dynamic Systems,* 1994, 3$^{rd}$ edition, written by Gene F. Franklin, J. David Powell and Abbas Emami-Naeini, and *Nonlinear Microwave Circuit,* 1998, written by Stephen A Maas. As can be seen from FIG. 3, the insertion loss of the desired lowest frequency 18.3 GHz is 5 dB, and a lowest insertion loss of the image frequency section 17.3~17.8 GHz is 40.3 dB. Therefore, the image frequency rejection ratio is 40.3−5=35.3 dB.

Generally, as the order of the hairpin band pass filter 20, or the number “n”, is getting higher, the rejecting effect of image frequency is getting better. However, the circuit area is also getting larger, and thus, increases cost. On the contrary, reducing the size and limiting the order of the hairpin band pass filter 20, the rejecting effect of image frequency may cause an insufficient condition, and influences the quality of signal receiving.

SUMMARY OF THE INVENTION

It is therefore a primary objective of the claimed invention to provide a band pass filter and related frequency down converter.

The present invention discloses a band pass filter which includes a first micro-strip port for receiving a radio-frequency signal, a second micro-strip port for outputting a filtered radio-frequency signal and comprising at least one resonating cavity formed for enhancing rejecting effect of image frequency corresponding to the filtered radio-frequency signal, and a plurality of resonators arranged between the first micro-strip port and the second micro-strip port for performing band pass filtering on the radio-frequency signal to generate the filtered radio-frequency signal.

The present invention further discloses a frequency down converter for enhancing rejecting effect of image frequency. The frequency down converter includes a receiver end for receiving a radio-frequency signal, a mixer for transforming a frequency of a filtered radio-frequency signal to a preset frequency according to a local oscillation (LO) signal, so as to outputting an intermediate frequency signal, and a band pass filter, coupled between the receiver end and the mixer, comprising a first micro-strip port which is coupled to the receiver end, for receiving a radio-frequency signal, a second micro-strip port which is coupled to the mixer, for outputting the filtered radio-frequency signal and comprising at least one resonating cavity formed for enhancing rejecting effect of image frequency corresponding to the filtered radio-frequency signal, and a plurality of resonators arranged between the first micro-strip port and the second micro-strip port for performing band pass filtering on the radio-frequency signal to generate the filtered radio-frequency signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
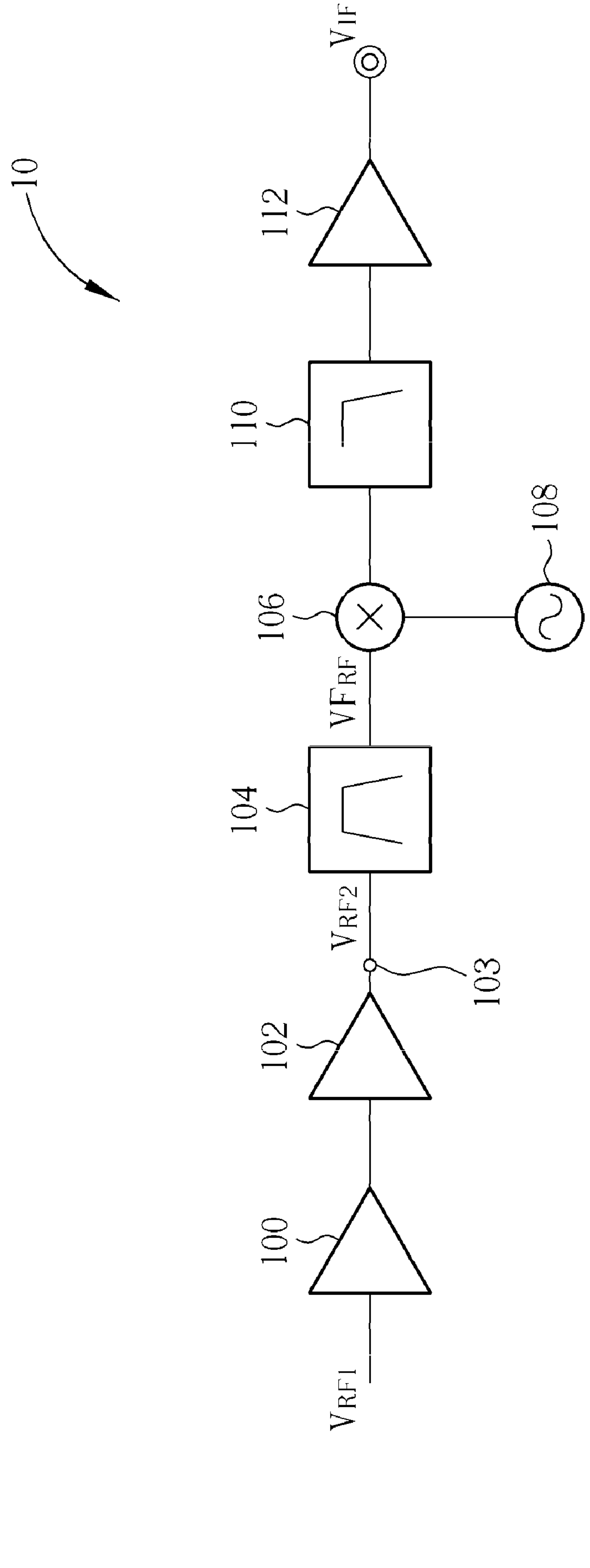
FIG. 1 PRIOR ART
FIG. 1 is a schematic diagram of a frequency down converter for a super heterodyne receiver according to the prior art.
Figure 4:
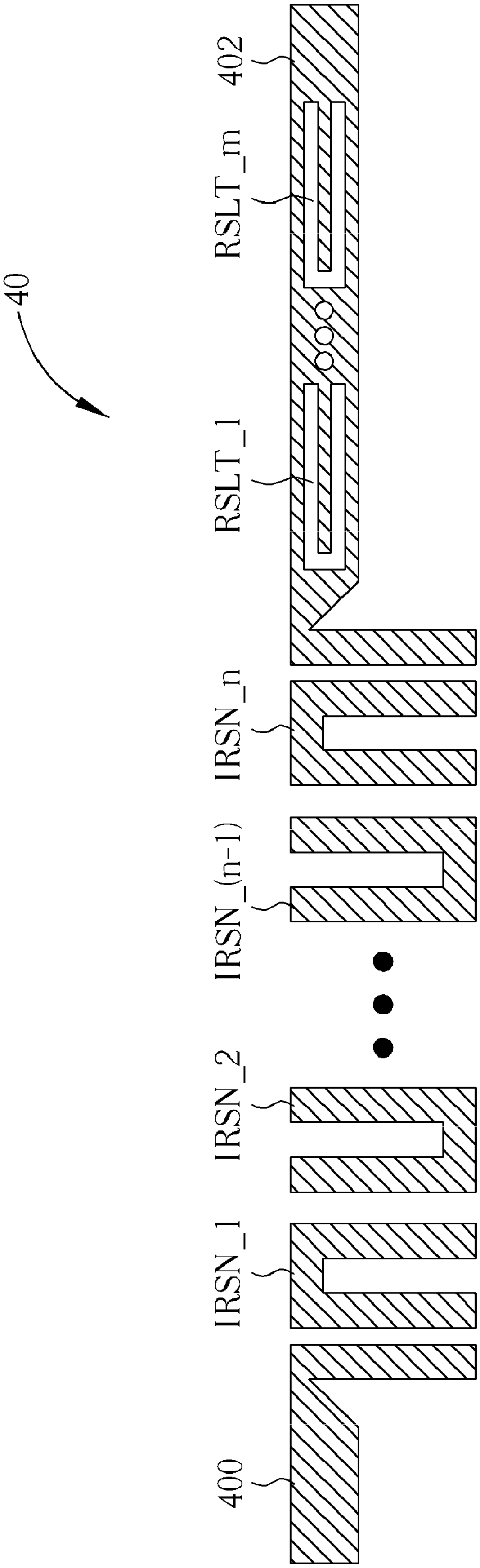
FIG. 4 is a schematic diagram of a hairpin band pass filter according to an embodiment of the present invention.

Please refer to FIG. 4, which is a schematic diagram of a hairpin band pass filter 40 according to an embodiment of the present invention. The hairpin band pass filter 40 is preferably utilized in a frequency down converter 10 shown in FIG. 1, and is used for realizing image reject filter 104. The hairpin band pass filter 40 includes a first micro-strip port 400, a second micro-strip port 402, and resonators IRSN_1~IRSN_n. The first micro-strip port 400 and the second micro-strip port 402 are used for connecting a front-stage and a rear-stage circuit, which are the low noise amplifier 102 (through the receiver end 103) and the mixer 106 shown in FIG. 1, so as to receive the RF signal $V_{RF2}$ and generating the filtered RF signal $VF_{RF}$. The resonators IRSN_1~IRSN_n is arranged between the first micro-strip port 400 and the second micro-strip port 402. Each of the resonators IRSN_1~IRSN_n is in a form of U-shape, and a total length thereof is half of a wavelength corresponding to the filtered RF signal $VF_{RF}$. In addition, resonating cavities RSLT_1~RSLT_m are formed in the second micro-strip port 402, and are used for enhancing rejecting effect of image frequency corresponding to the filtered RF signal $VF_{RF}$.

Figure 2:
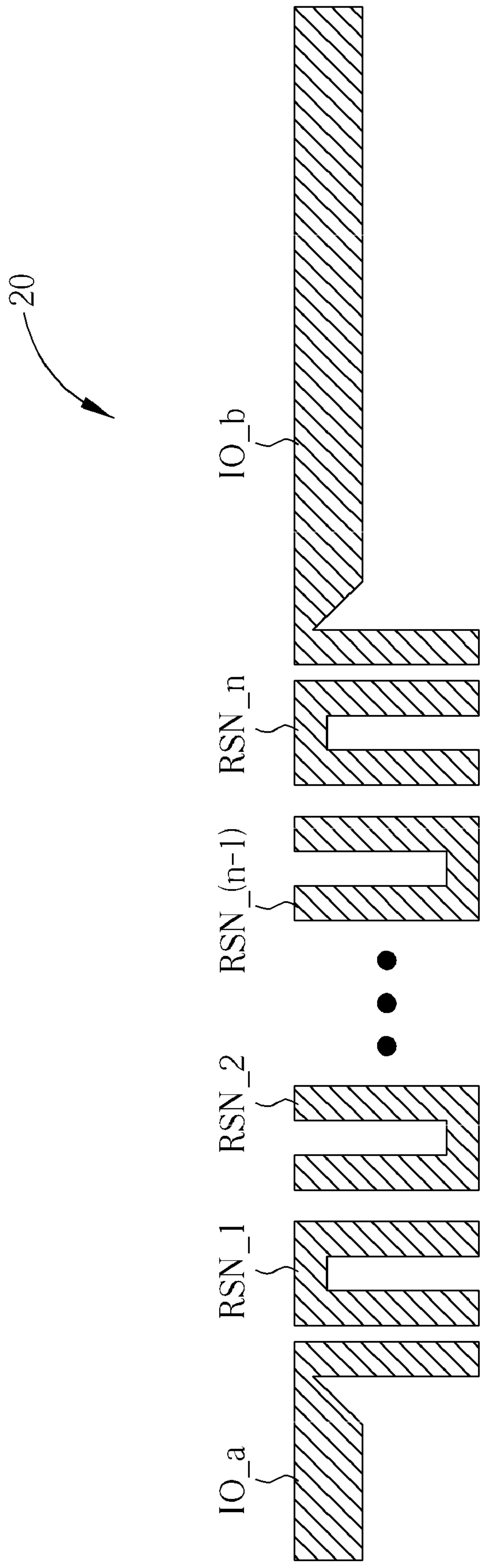
FIG. 2 PRIOR ART
FIG. 2 is a schematic diagram of a hairpin band pass filter according to the prior art.

As can be seen by comparing FIG. 4 and FIG. 2, structures of the hairpin band pass filter 40 and the hairpin band pass filter 20 are similar. A difference is that the resonating cavities RSLT_1~RSLT_m are formed in the second micro-strip port 402. In a word, the present invention forms the resonating cavities RSLT_1~RSLT_m in the second micro-strip port 402, to generate rejecting effect to a signal whose wavelength is twice of a length of each of the resonating cavities RSLT_1~RSLT_m, which means that the length of each of the resonating cavities RSLT_1~RSLT_m is half of the wavelength corresponding to the filtered RF signal $VF_{RF}$. Therefore, the rejecting effect of image frequency can be enhanced without increasing the number of the resonators IRSN_1~IRSN_n.

In FIG. 4, the resonating cavities RSLT_1~RSLT_m are in a form of U-shape, and a length of each of the resonating cavities RSLT_1~RSLT_m is half of a wavelength corresponding to the filtered RF signal $VF_{RF}$, for forming the rejecting effect around the filtered RF signal $VF_{RF}$. For circuit design, those skilled in the art can accordingly select lengths, intervals, widths, an amount, etc of the resonating cavities RSLT_1~RSLT_m for adjusting the rejecting effect of image frequency to implement a request of the standard.

Figure 3:
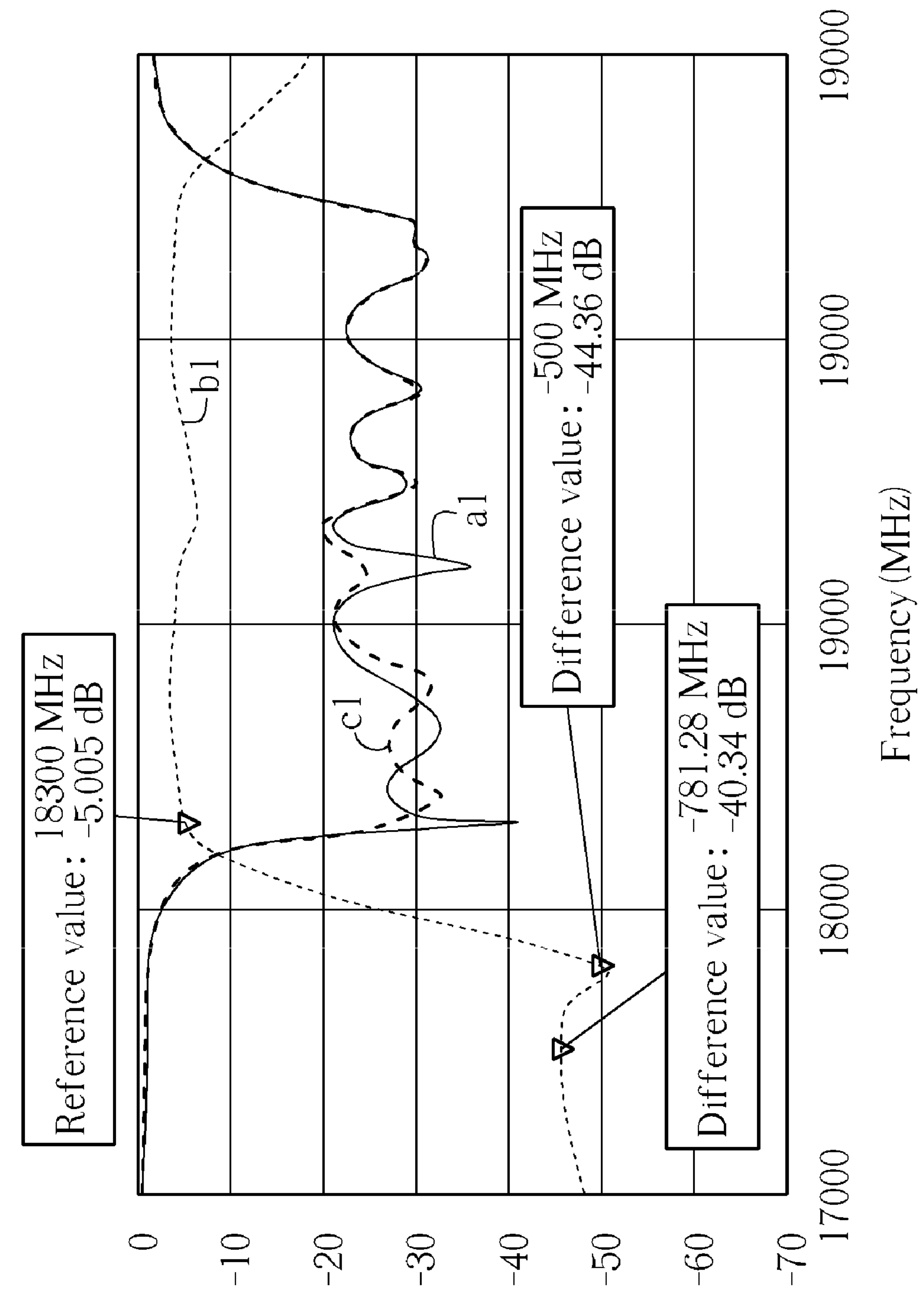
FIG. 3 PRIOR ART
FIG. 3 is a frequency response diagram of a hairpin band pass filter in $5^{th}$ order according to FIG. 2.
Figure 5:
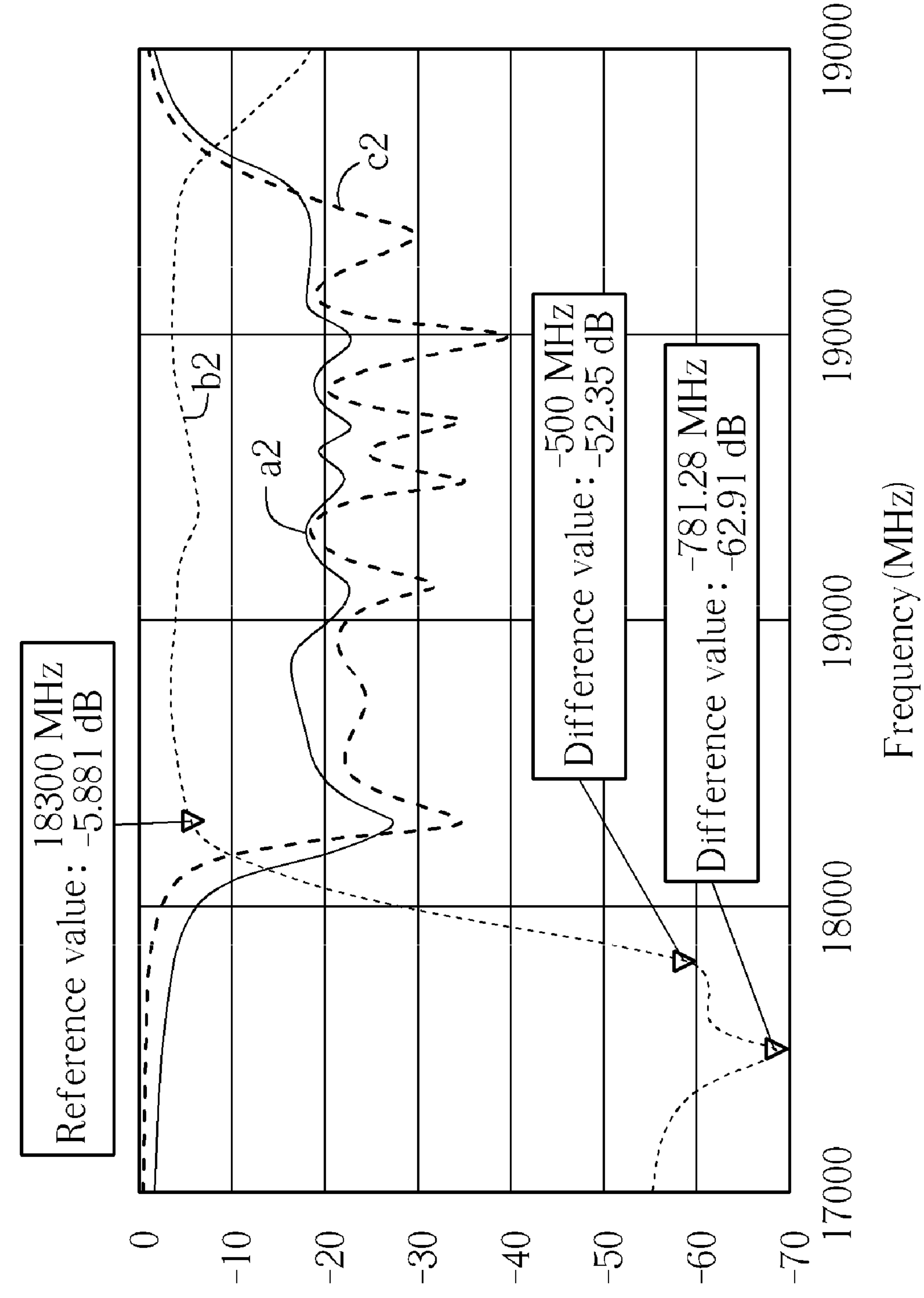
FIG. 5 is a frequency response diagram of a hairpin band pass filter in $5^{th}$ order comprising two resonating cavity according to FIG. 4.

For example, FIG. 5 is a frequency response diagram of the hairpin band pass filter 40 when n=5, m=2. In FIG. 5, curves a2, b2 and c2 are respectively corresponding to the scattering parameters S11, S21 and S22. A related definition is fairly known for people in the art, so a detail description is omitted herein. As can be seen from FIG. 5, an insertion loss of a desired lowest frequency 18.3 GHz is 5.9 dB, and a lowest insertion loss of the image frequency section 17.3~17.8 GHz is 52.4 dB. Therefore, an image frequency rejection ratio is 52.4−5.9=46.5 dB, which increases 11 dB compared to the prior art (refer to FIG. 3), so as to implements the request of the standard without increasing the circuit area.

Note that, FIG. 4 is a schematic diagram of the hairpin band pass filter 40, and those skilled in the art can make modifications and alterations accordingly. For example, besides forming the resonating cavities RSLT_1~RSLT_m in the second micro-strip port 402, resonating cavities can be formed in the first micro-strip port 400. In addition, a method for forming the resonating cavities RSLT_1~RSLT_m is not limited in a certain process, for example, the resonating cavities RSLT_1~RSLT_m are formed in the second micro-strip port 402 by an etching process. Moreover, the hairpin band pass filter 40 replaces the image reject filter 104 shown in FIG. 1 for enhancing the rejecting effect of image frequency of the frequency down converter 10. A related connection method shall be realized for those skilled in the art, so the detailed description is omitted herein. Furthermore, though the hairpin band pass filter 40 of the present invention replaces the image reject filter 104 shown in FIG. 1, the application of the present invention is not limited in a hairpin band pass filter. The present invention can be utilized to other band pass filters, such as parallel-coupled line filters, and an improving method can be referred to the hairpin band pass filter 40 shown in FIG. 4.

In conclusion, the present invention forms at least one resonating cavity in a micro-strip line for enhancing an insertion loss of an image frequency section, so as to increasing a rejecting effect of image frequency. In other words, the present invention can enhance a rejecting effect of image frequency without increasing an amount of a resonator, maintain a circuit area, and efficiently increase a signal receiving quality.

Those skilled in the art will readily observe that numerous modifications and alterations of the device and method may be made while retaining the teachings of the invention.

What is claimed is:

1. A frequency down converter for enhancing rejecting effect of image frequency, the frequency down converter comprising:

a receiver end for receiving a radio-frequency signal;

a mixer for transforming a frequency of a filtered radio-frequency signal to a preset frequency according to a local oscillation signal, so as to outputting an intermediate frequency signal; and a band pass filter coupled between the receiver end and the mixer, the band pass filter comprising:

a first micro-strip port for receiving a radio-frequency signal;

a second micro-strip port for outputting a filtered radio-frequency signal, the second micro-strip port comprising at least one resonating cavity formed for enhancing rejecting effect of image frequency corresponding to the filtered radio-frequency signal; and a plurality of resonators arranged between the first micro-strip port and the second micro-strip port for performing band pass filtering on the radio-frequency signal to generate the filtered radio-frequency signal.

2. The frequency down converter of claim 1, wherein each of the at least one resonating cavity is in a form of U-shape.

3. The frequency down converter of claim 1, wherein a length of each of the at least one resonating cavity is half of a wavelength corresponding to the filtered radio-frequency signal.

4. The frequency down converter of claim 1, wherein the at least one resonating cavity is formed in the second micro-strip port by an etching process.

5. The frequency down converter of claim 1, wherein each of the plurality of resonators is in a form of U-shape.

6. The frequency down converter of claim 1, wherein a length of each of the plurality of resonators is half of a wavelength corresponding to the filtered radio-frequency signal.

7. The frequency down converter of claim 1 being utilized in a super heterodyne receiver.

8. The frequency down converter of claim 1, wherein the band pass filter is a hairpin band pass filter.

9. The frequency down converter of claim 1, wherein the band pass filter is a parallel-coupled strip filter.

10. A band pass filter comprising:

a first micro-strip port for receiving a radio-frequency signal;

a second micro-strip port for outputting a filtered radio-frequency signal, the second micro-strip port comprising at least one resonating cavity formed for enhancing rejecting effect of image frequency corresponding to the filtered radio-frequency signal; and a plurality of resonators arranged between the first micro-strip port and the second micro-strip port for performing band pass filtering on the radio-frequency signal to generate the filtered radio-frequency signal.

11. The band pass filter of claim 10, wherein each of the at least one resonating cavity is in a form of U-shape.

12. The band pass filter of claim 10, wherein a length of each of the at least one resonating cavity is half of a wavelength corresponding to the filtered radio-frequency signal.

13. The band pass filter of claim 10, wherein the at least one resonating cavity is formed in the second micro-strip port by an etching process.

14. The band pass filter of claim 10, wherein each of the plurality of resonators is in a form of U-shape.

15. The band pass filter of claim 10, wherein a length of each of the plurality of resonators is half of a wavelength corresponding to the filtered radio-frequency signal.

16. The band pass filter of claim 10, wherein the band pass filter is a hairpin band pass filter.

17. The band pass filter of claim 10, wherein the band pass filter is a parallel-coupled strip filter.

* * * * *